US012190673B2

(12) United States Patent
Rosette

(10) Patent No.: US 12,190,673 B2
(45) Date of Patent: Jan. 7, 2025

(54) VIDEO DISPLAY SYSTEM FOR GAMING MACHINES USING LIVE SPORTING EVENT ODDS

(71) Applicant: Robert A. Rosette, Chandler, AZ (US)

(72) Inventor: Robert A. Rosette, Chandler, AZ (US)

(73) Assignee: BET STREAM MEDIA, LLC, Tempe, AZ (US)

( * ) Notice: Subject to any disclaimer, the term of this patent is extended or adjusted under 35 U.S.C. 154(b) by 8 days.

(21) Appl. No.: 17/859,952

(22) Filed: Jul. 7, 2022

(65) Prior Publication Data

US 2023/0009825 A1 Jan. 12, 2023

Related U.S. Application Data

(60) Provisional application No. 63/220,999, filed on Jul. 12, 2021.

(51) Int. Cl.
*A63F 9/24* (2006.01)
*A63F 11/00* (2006.01)
*G06F 13/00* (2006.01)
*G06F 17/00* (2019.01)
*G07F 17/32* (2006.01)

(52) U.S. Cl.
CPC ...... *G07F 17/3211* (2013.01); *G07F 17/3288* (2013.01)

(58) Field of Classification Search
CPC ............................ G07F 17/32; G07F 17/3214
USPC ........................ 463/1, 20, 22, 25, 30, 31, 39
See application file for complete search history.

(56) References Cited

U.S. PATENT DOCUMENTS 10,997,825 B2 5/2021 Neely et al.
2006/0246973 A1* 11/2006 Thomas .................. A63F 13/79 463/4
2022/0028209 A1 1/2022 Lind et al.
2022/0122409 A1* 4/2022 Huke .................... G07F 17/323

* cited by examiner

*Primary Examiner* — Adetokunbo O Torimiro
(74) *Attorney, Agent, or Firm* — SLATER MATSIL, LLP

(57) ABSTRACT

A gaming display system and method, the method including receiving, at a gaming machine, from a player, an indication to bet on one or more live sporting events, determining a sub-event of a selected event that is a discrete portion of the selected event, determining one or more propositions for the sub-event, where each proposition is associated with a different potential outcome of the sub-event, applying at least one bet to the one or more propositions, initiating display of a non-sporting display to the player, determining one or more resolutions for the one or more propositions while displaying the non-sporting video display, displaying a result of the non-sporting video display to the player according to the one or more resolutions, and determining a payout for each proposition of the one or more propositions according to odds of the respective proposition and the resolution of the respective proposition.

20 Claims, 9 Drawing Sheets

500

504 506 508 510

502

| Event ID | Matchup | Event Type | Status/Time |
|---|---|---|---|
| 1489758 | Dayton Drifters vs Greenville Stars | Baseball | Running |
| 1489765 | Detroit Engines vs Nashville Notes | Baseball | Running |
| 1489783 | Montana Ice vs. Idaho Hawks | Basketball | Running |
| 1489789 | Miami Cyclones vs. Tulsa Tornadoes | Baseball | 2:05 p.m. |
| 1489796 | Oregon Univ. vs. Texas State Univ. | Football | 2:15 p.m. |

Fig. 5A

540

542

| Event ID (504) | SEID (544) | PrID (546) | SE Type (548) | Proposition (550) | Time (552) | Odds (554) |
|---|---|---|---|---|---|---|
| 1489758 | 1004 | 100403 | Next Pitch | Strike | 14:08:10 | .57440 |
| 1489758 | 1004 | 100404 | Next Pitch | Ball | 14:08:10 | .37473 |
| 1489758 | 1004 | 100405 | Next Pitch | Hit | 14:08:10 | .05087 |
| 1489758 | 1004 | 100406 | Next Pitch | Foul | 14:08:10 | .28125 |
| 1489758 | 1004 | 100407 | Next Pitch | Double | 14:08:10 | .02843 |
| 1489758 | 1004 | 100408 | Next Pitch | Home Run | 14:08:10 | .00610 |
| | | ⋮ | | | | |
| 1489765 | 1119 | 111903 | Next Pitch | Strike | 14:08:17 | .60080 |
| 1489765 | 1119 | 111904 | Next Pitch | Ball | 14:08:17 | .35933 |
| 1489765 | 1119 | 111905 | Next Pitch | Hit | 14:08:17 | .03987 |
| 1489765 | 1119 | 111906 | Next Pitch | Foul | 14:08:17 | .29553 |
| 1489765 | 1119 | 111907 | Next Pitch | Double | 14:08:17 | .02725 |
| 1489765 | 1119 | 111908 | Next Pitch | Home Run | 14:08:17 | .00580 |

Fig. 5B

| Event ID | SEID | PrID | Prop Outcome | Actual Outcome | Time | Odds |
|---|---|---|---|---|---|---|
| 1489758 | 1004 | 100403 | Lose | Hit, Double, Run | 14:08:37 | .57440 |
| 1489758 | 1004 | 100404 | Lose | Hit, Double, Run | 14:08:37 | .37473 |
| 1489758 | 1004 | 100405 | Win | Hit, Double, Run | 14:08:37 | .05087 |
| 1489758 | 1004 | 100406 | Lose | Hit, Double, Run | 14:08:37 | .28125 |
| 1489758 | 1004 | 100407 | Win | Hit, Double, Run | 14:08:37 | .02843 |
| 1489758 | 1004 | 100408 | Lose | Hit, Double, Run | 14:08:37 | .00610 |

602

VIDEO DISPLAY SYSTEM FOR GAMING MACHINES USING LIVE SPORTING EVENT ODDS

CROSS-REFERENCE TO RELATED APPLICATIONS

This application claims the benefit of U.S. Provisional Application No. 63/220,999, filed on Jul. 12, 2021, which application is hereby incorporated herein by reference.

TECHNICAL FIELD

The present invention relates generally to a system and method for providing a gaming system for live sporting event wagering, and, in particular embodiments, to a system and method for a video display system for gaming machines that use live sporting events odds and outcomes for providing the odds and outcomes for gaming machine plays.

BACKGROUND

Sports betting is becoming increasingly popular and legal throughout the country. Additionally, many sports teams now have the ability to operate mobile and retail sports betting. Sports betting is also no longer limited to the outcome of a particular game, match, or tournament. Sports bettors can now bet on events during a game (e.g. each pitch, player performance metrics, etc.). Moreover, machine learning and online odds compiling experts can now provide bookmakers with specific odds tied to each event (e.g. odds can be tied to each pitch and can lay odds on whether the pitch will be a strike, a ball, a hit, or homerun, etc.).

However, sports bettors are also often fans of a particular sport. While many gamblers may wish to engage in granular level sports betting, they may find following play-by-play accounts less exciting than engaging with traditional gambling or gaming machine interfaces. Accordingly, improvements to video display systems for gaming machines that utilize live sports betting odds are desired.

SUMMARY

An embodiment device includes at least one processor, and a non-transitory computer readable medium connected to the at least one processor and having a computer program stored thereon for execution by the at least one processor. The computer program includes instructions for receiving an event selection from a player, wherein the event selection indicates selection of an event from one or more live sporting events available for betting, receiving a live feed associated with the event, wherein the live feed includes at least a data feed having first data associated with the event, receiving an indication of a bet from the player, identifying, according to first data in the live feed, one or more available sub-events for the event, wherein each available sub-event of the one or more available sub-events is a discrete portion of the event and is shorter than the event, wherein one or more propositions are associated with each available sub-event of the one or more available sub-events, and wherein, for each available sub-event of the one or more available sub-events, each proposition of the one or more propositions of an associated available sub-event is associated with a different potential outcome of the associated available sub-event, selecting a sub-event from the one or more available sub-events, and applying the bet to at least one first proposition associated with the sub-event, determining an outcome of the sub-event, determining a resolution of the first proposition according to the outcome of the sub-event, and displaying a non-sporting video display to the player illustrating the resolution of the first proposition.

An embodiment method includes receiving, at a gaming machine, from a player, an indication of a desire to bet on one or more live sporting events, determining a sub-event of a selected event of the one or more live sporting events, wherein the sub-event is a discrete portion of the selected event that is shorter than the selected event, determining one or more propositions for the sub-event, wherein each proposition of the one or more propositions is associated with a different potential outcome of the sub-event, applying at least one bet to the one or more propositions in response to the indication of the desire to bet the event, initiating display of a non-sporting display to the player, determining one or more resolutions for the one or more propositions while displaying the non-sporting video display, displaying a result of the non-sporting video display to the player according to the one or more resolutions, and determining a payout for each proposition of the one or more propositions according to odds of the respective proposition being met and according to a resolution of one or more resolutions for the respective proposition.

[thaw] An embodiment method includes receiving, by a gaming machine, an event selection from a player, wherein the event selection indicates selection of an event from one or more live sporting events available for betting, receiving a live feed associated with the event, wherein the live feed includes at least a data feed having first data associated with the event, receiving, by the gaming machine, an indication of a bet from the player, identifying, according to first data in the live feed, one or more available sub-events for the event, wherein each available sub-event of the one or more available sub-events is a discrete portion of the event and is shorter than the event, wherein one or more propositions are associated with each available sub-event of the one or more available sub-events, and wherein, for each available sub-event of the one or more available sub-events, each proposition of the one or more propositions of an associated available sub-event is associated with a different potential outcome of the associated available sub-event, selecting a sub-event from the one or more available sub-events, and applying the bet to at least one first proposition associated with the sub-event, determining an outcome of the sub-event, determining a resolution of the first proposition according to the outcome of the sub-event, and displaying, by the gaming machine, a non-sporting video display to the player, the video display illustrating the resolution of the first proposition in a context of the non-sporting video display.

BRIEF DESCRIPTION OF THE DRAWINGS

The present application can be best understood by reference to the following description taken in conjunction with the accompanying figures, in which like parts may be referred to by like numerals:

FIG. 5A is a table illustrating event data for event selection according to some embodiments;

FIG. 5B is a table illustrating sub-event data with associated proposition data according to some embodiments;

Figure 1:
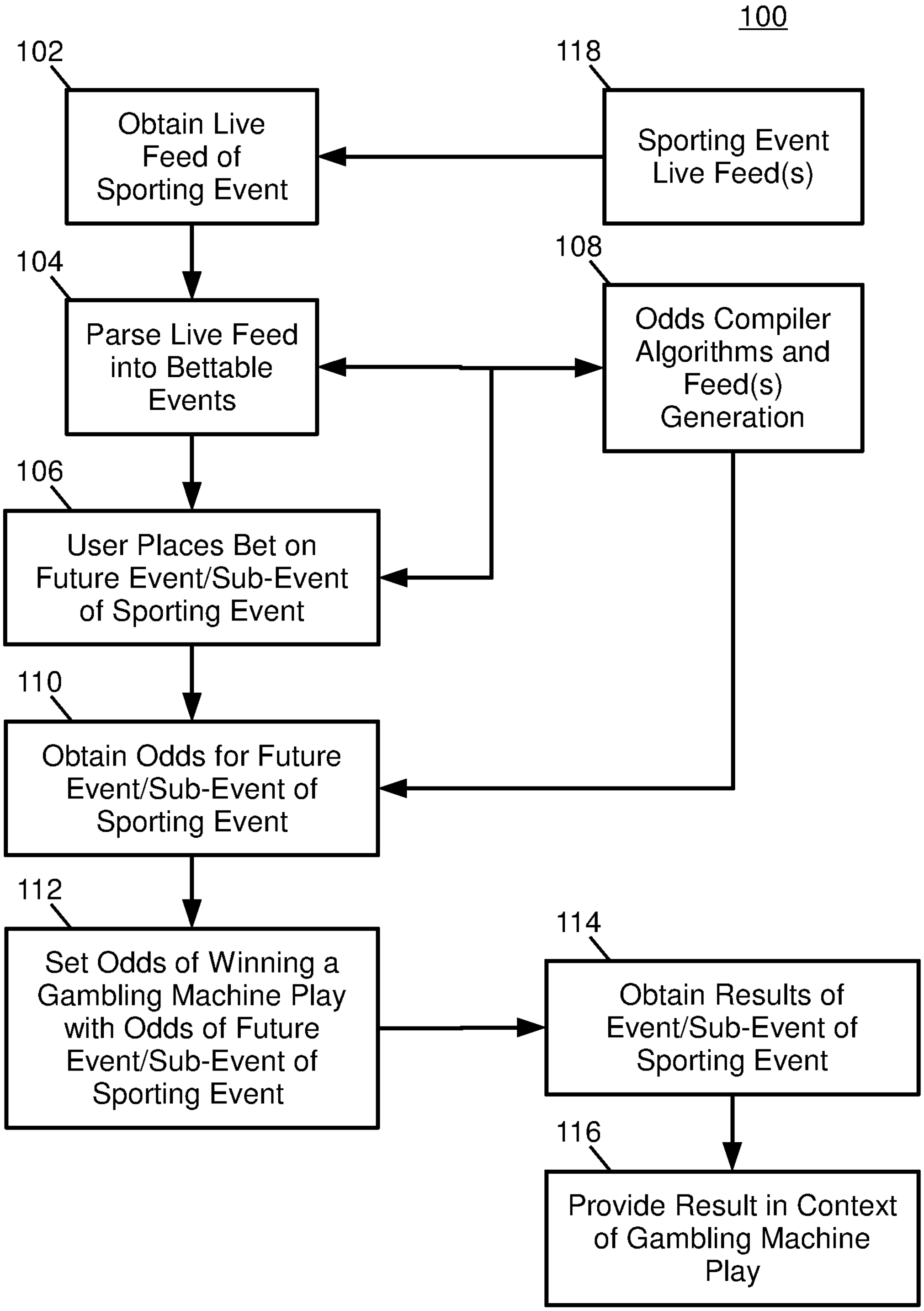
FIG. 1 is a flow diagram illustrating a gaming machine video display process, according to some embodiments.

The Figures described above are a representative set and are not exhaustive with respect to embodying the invention.

DETAILED DESCRIPTION OF ILLUSTRATIVE EMBODIMENTS

Disclosed are a system, method, and article of manufacture of a video display system for gaming machines. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of the embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring certain aspects of the invention.

Some of the schematic flow chart diagrams included herein are set forth as logical flow chart diagrams. As such, the depicted order and labeled elements are indicative of one embodiment of the presented method, but are not limited to order. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

An "Application Programing Interface" (API) is an interface that provides a connection between computers or between computer programs. An API can be a type of software interface, offering a service to other pieces of software.

A "Bookmaker" is an organization or a person that accepts and pays off bets on sporting and other events at agreed-upon odds.

"Machine Learning" can be the application of artificial intelligence (AI) in a way that allows the system to learn for itself through repeated iterations. It can involve the use of algorithms to parse data and learn from it. Machine learning is a type of artificial intelligence that provides computers with the ability to learn without being explicitly programmed. Machine learning focuses on the development of computer programs that can teach themselves to grow and change when exposed to new data. Example machine learning techniques that can be used herein include, inter alia, decision tree learning, association rule learning, artificial neural networks, inductive logic programming, support vector machines, clustering, Bayesian networks, reinforcement learning, representation learning, similarity and metric learning, sparse dictionary learning or other machine learning training techniques.

An "Odds compiler" is an entity (e.g. person, organization, and/or AI-based entity) used by a bookmaker or betting exchange that sets the odds for events (e.g. such as sports-betting events), sub-events or propositions for players to place bets on.

"Sports betting" is the activity of placing a wager on the outcome of a sports event, or on a sub-event or proposition within the sports event. Sports betting can include such sports as, inter alia, association football, American football, basketball, baseball, hockey, track cycling, auto racing, mixed martial arts, boxing, or any other sporting event.

A "proposition bet," "proposition wager" or "prop bet" is a wager on a non-final outcome of a sporting event. Proposition bets are bets that can be made against any definable action or occurrence in a sporting event where a concrete result can be determined. For example, a bet may be made in a boxing match on whether the match will go past a predetermined number of rounds, whether a predetermined number of runs will be scored in an inning of a baseball game, whether the next pitch on a baseball game will be a strike, whether a receiver in a football game will get more than a predetermined number of yards, or the like.

Sports betting can include betting on the outcome of an event (e.g. game, tour, race, etc.) or on various sub-events or sub-elements of a sporting event through a proposition bet. Likewise, sports betting can also extend to non-athletic events (e.g. reality show contests, political elections, non-human contests such as horse racing, greyhound racing, etc., weather events, etc.). Events and/or sub-events can have a binary outcome (e.g. a win or loss, a score exceeding a preset limit, etc.), gradient outcome (e.g. integers of points scored), etc. Sub-events may be discrete portions of an event that are shorter or less than the entire event. Propositions are various potential outcomes of a sub-event. Some propositions may be exclusive of other propositions, where only one proposition is met or true at the end of the sub-event. Other propositions may overlap with other propositions, or be true when other propositions are true. For example, a sub-event in a baseball game event may be a next pitch, an inning, a half-inning or a set or group of pitches or innings, or an at—bat. In another example, a football play or possession may be a sub-event for an American football game, and a possession or discrete time period (such as a 2-minute period) may be a sub-event for a soccer game or a basketball game. In the case of a next pitch sub-event for a baseball game, exclusive propositions may be whether the next pitch results in a ball, strike or hit, since a pitch can only result in one of those outcomes. Overlapping or non-exclusive propositions for this type of sub-event may be the next pitch being a hit, and the batter getting a double or a triple or home run, which are overlapping because the batter getting a double, triple or home run would be true when the batter got a hit. However, the odds of a hit would be different from the odds of a double, which would be different from the odds of a triple, and which would all be different from the odds of the batter getting a home run.

FIG. 1 is a flow diagram illustrating a gaming machine video display process wo, according to some embodiments. In block 102, a live feed 118 of a sporting event is obtained. The live feed can be formatted for viewing by a player to enable the player to engage in sports betting and view the sporting event in real-time or in near-real time, for example, with a delay, or the like. The live feed 118 can also be formatted and parsed for event and sub-event level analysis. For example, a live feed of a football game can be formatted for analysis on a play-by-play analysis, quarter analysis, overall game analysis, player action level analysis, etc. In another example, a live feed of a baseball game may be formatted for analysis at a pitch-by-pitch, half inning, inning, or other portion of a baseball game. This permits players to place sports bets on granular actions or propositions within one particular game.

Additionally, the live feed can be decomposed into data that is usable or analyzable by a computer system to generate wagering-related data. For example, an odds compiler system may use the live feed along with other data (previous sports event data, historical data, player statistics, or another type of data) to generate odds or statistics for events and sub-events associated with the sports event. The odds compiler can include human experts (expert bookmakers, or the like), machine learning/AI odds compiler systems and/or a combination thereof. For example, a human may be used to recognize the timing for the beginning or end of a particular pitch in a baseball game, and an AI system may determine the odds of various potential outcomes for the pitch, for example, the pitch being a strike, a ball, a hit, a single/double/triple/home run, a foul ball, or the like. Additionally, a human or AI may determine the outcome of the sub-event, so that the result of the pitch can be entered into the data feed.

Furthermore, historical information relevant to the sporting event can be obtained. These can include team statistics, player statistics, venue statistics, weather statistics, or other variables. This information can be used to develop and optimize odds analysis and models for sports betting. In block 108, odds compiler algorithms generate odds for various sub-events of a sports event, and generate one or more odds feed(s) that may, in some embodiments, be associated with the live feed. These odds are derived from odds for the specified sports event and/or sub-event, and an odds feed may include a listing of sub-events for a particular sporting event, along with various propositions wagers, or prop bets, and associated odds for the sub-event.

In block 104, the sports event live-feed 118 is parsed into bettable elements. This permits identification of sub-elements of a sports event on which a player can bet, such as a single field goal, a pitch, a score for a quarter of play, a set of free throws, etc.

In block step 106, the player places a bet on a future event/sub-event of the sporting event. This may or may not be a direct bet on the sporting event. The player can utilize a gaming device or gaming machine such as a dedicated device, kiosk, mobile application, browser page, or the like, to play a non-sporting game such as a slot machine game that indirectly uses a sporting event bet outcome to determine its result. In some examples, this can be a stand-alone gaming device such as slot machine, a virtual slot machine, a poker machine, mobile device with a virtual gaming machine mobile application, or the like.

In block 110, the odds for the future event, sub-event or proposition of the sporting event are obtained. The odds feed can be combined with the player bets on the sporting events, sub-events or propositions. In block 112, the odds of winning a gaming machine play are set with odds of the future event, sub-event or proposition of the sporting event. In block 114, results of the event, sub-event, or proposition of the sporting event are obtained. In block 116, a result of the bet is provided in the context of a gaming machine play. In this way, the gaming device can enable players to play various casino style games, such as virtual slot machines, poker games, or the like, using odds derived from the specified sports event or sub-event.

Players can place future bets on sporting events. In baseball, for example, a player can bet on each pitch of a baseball game that is currently in progress. An underlying algorithm, such as an odds compiler algorithm, can determine odds on each pitch for a particular player. The player can then make the bet by inserting the money into a video enhancement device such as a gaming machine or the like. In this example, a player can play $1.00 for each of the next 100 pitches, by inserting a $100 bill.

Each time the player pushes a button to bet on the video enhancement device, the player engages in an in-game sports bet on, for example, the next in-game pitch, as provided via the sporting event live feed 118. The results and the odds of the specific in-game sports bet is used for a slot machine interface or a video poker interface that then utilizes the results with the compiled odds. An odds compiler entity will determine the odds of various outcomes of each pitch through their own sports betting algorithms. However, the player receives the results through the video enhancement device. For example, a result of the bet on a sub-event such as a pitch in a baseball game may be shown as a result of spinning reels of a virtual slot machine, a hand of video poker, video blackjack, craps, or the like. Thus, a bettor may place bets on sports events, sub-events and propositions, and have the results displayed in a non-sporting event context such as a non-sporting event video display, a video animation, or game context. This may allow non-sports betting fans to enjoy wagering in a more familiar context.

For example, a player can push a slot play button to make a bet on the next pitch, and the algorithmic processes of sports betting companies determine the odds for each pitch. The actual pitch determines the outcome on whether the player wins or loses, but the player receives their results via the spinning reels of a non-sporting game or video animation such as a slot-machine interface, either physical or virtual. Between the time the player pushes the button to begin the reels spinning and the time the reels stop spinning, the player is entered into an in-game sports bet. The results of the sports bet are then reported to the player by the pattern of the reels when the reels stop, indicating whether or not the player wins a prize. For example, if the pitch is a strike, the player may lose the bet and the spinning reels will show a "cherry," a "lemon" and/or a "bar." However, if the pitch is a ball, then the player wins a smaller prize such as "three cherries." In the event the pitch is a "home run," the player may hit a jackpot with three "blazing 7's." In this way, a state of the sporting sub-event result (e.g. homerun, strike, single, double, ball, etc.) can determine a state of the slot-machine result. Additionally, a player may play multiple pay lines or "lines," where multiple winning outcomes may be achieved, and the result may be output as winning different lines on a multi-line slot machine. For example, a pitch that results in a hit for two bases (a double), with a run scored or batted in, may pay out for the hit, for the double, and for the scored run, with different lines on the reel showing wins. In this way, the player has an experience that is virtually identical to a slot machine but one that uses the results of not only a live game, but an actual player's results from that real-time sporting event.

Figure 2A:
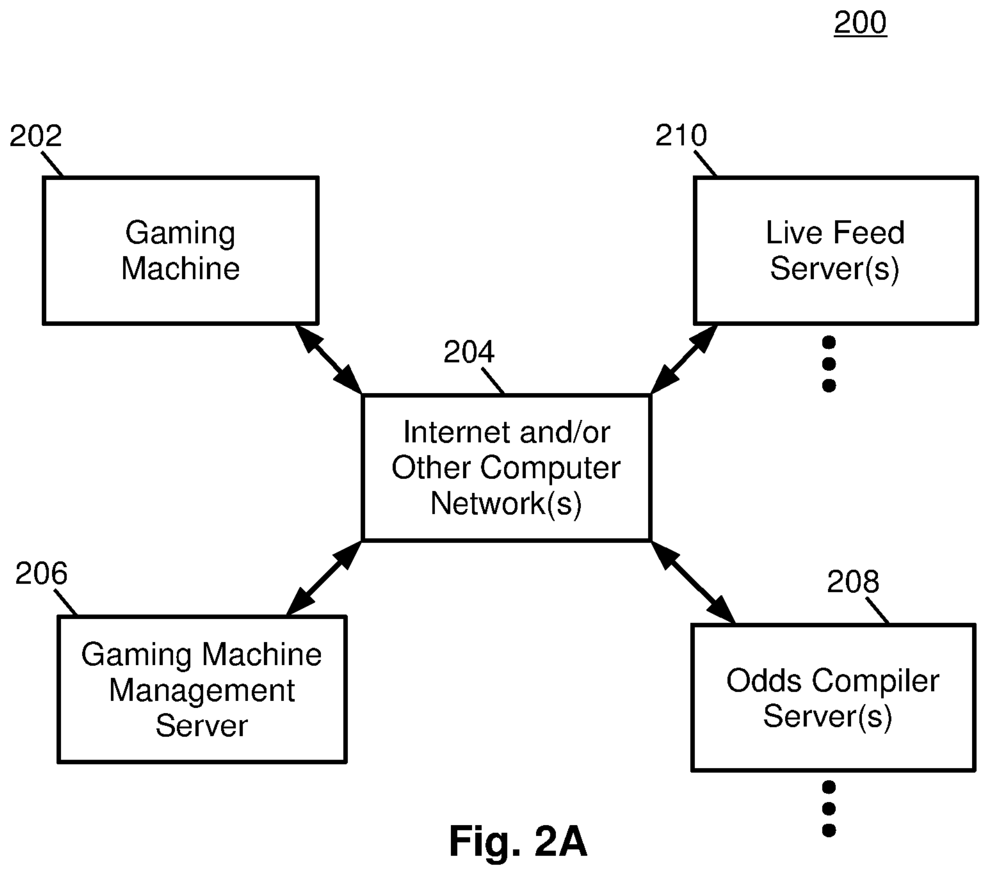
FIGS. 2A and 2B are logical diagrams illustrating a system for gaming machine video play and display using live sporting event results according to some embodiments.

FIG. 2A is a logical diagram illustrating the system 200 for gaming machine video play and display using live sporting event results according to some embodiments. The system 200 includes the gaming machine 202. The gaming machine 202 may be a casino-style gaming machine such as a slot machine, video poker machine, or the like, or may be a mobile device with a mobile application, or another type of gaming device. The gaming machine 202 can interface with the other systems of system 200 via the Internet and/or other computer networks 204, including, but not limited to, secure local area networks (LANs), virtual private networks (VPNs), enterprise networks, cellular data networks, or other secure networks. The gaming machine 202 can utilize the stochastic and random properties of live sporting events to generate a machine state, such as a win, a loss, and the like, instead of using a random number generator.

The gaming machine management server 206 may manage the implementation of process wo for the gaming machine 202. The gaming machine management server 206 can utilize various APIs to obtain odds feeds, sporting event feeds, player bets, and the like, from the various subsystems of system 200. For example, odds compiler servers 208 can provide odds feeds for sporting events, sporting sub-events or other potential proposition bets. Odds compiler servers 208 can calculate odds using human, AI, machine learning systems, or other automated systems. Odds compiler servers 208 can also include historical statistical data for various sports players, teams, coaches, injury records, etc., in the feeds. In some embodiments, the odds compiler servers 208 can provide a live feed through an API that provides odds data, or streaming data that is pushed to the gaming machine management server 206.

Live feed servers 210 can provide live sporting event feeds. These can be video feeds, commentator feeds, AI-parsed feeds of individual player actions, or the like. In some embodiments, the gaming machine management server 206 may use information from the video feed to determine results for various sub-events or proposition bets to determine if a player wins or loses a bet and set the state of gaming device 202 as a result. The state can be provided in terms of a traditional casino game interface (e.g. showing a winning spin of a slot machine when the player wins a sports bet, etc.). In other embodiments, the odds compiler servers 208 can use the information from the live feed or video feed to determine the outcome of an event, sub-event or proposition bet, and provide data indicating the results to the gaming machine management servers 206, and may also use the resulting information to determine odds of future events. The live feed may also be provided to the gaming machine 202, so that players can view or otherwise use the sports feeds to engage with a sporting event. In some example embodiments, the various elements of system 200 can perform relevant portions of process 100.

Figure 2B:
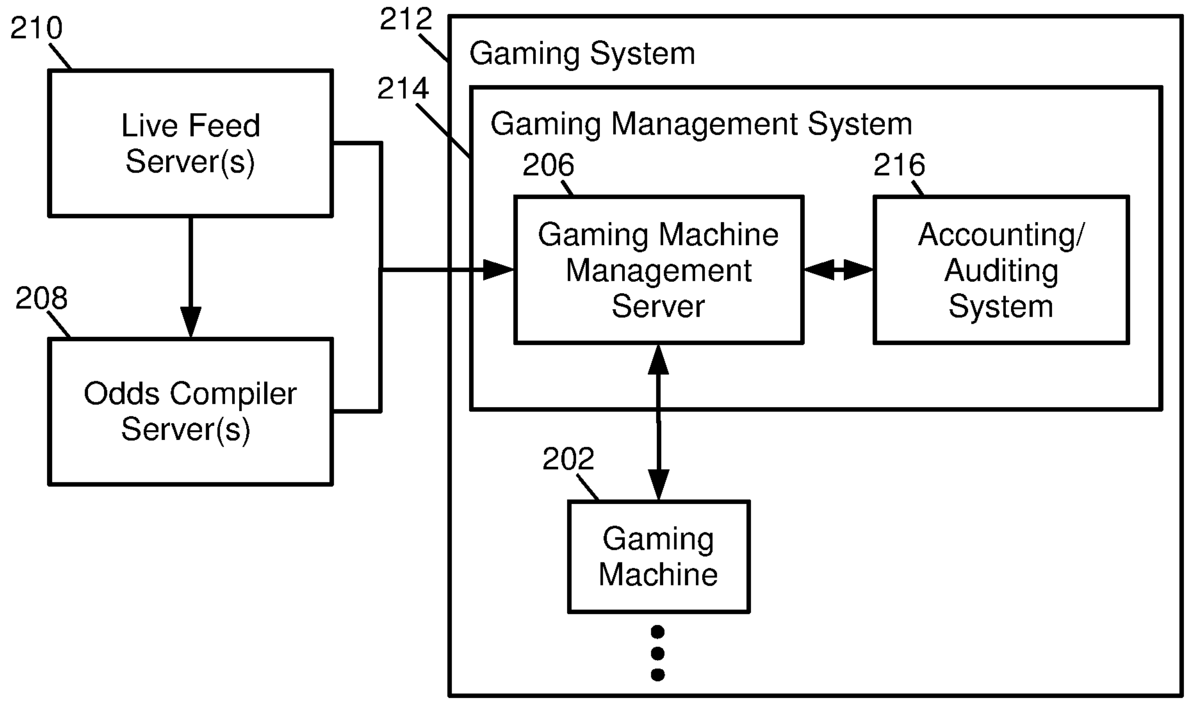

FIG. 2B is a logical diagram illustrating the system 200 for gaming machine video play and display using live sporting event results according to some embodiments. The system 200 may include one or more live feed servers 210 that provide a video stream of a live sporting event, or may provide highlights, streams, scenes or other data related to the live sporting event. The live feed server 210 may communicate the live feed to one or more odds compiler servers 208 that generate the odds feeds, which may use the live feed for generation of the odds feed. In some embodiments, the live feed server 210 may generate a live feed for one or more live sporting events, and may provide the live feed directly to the gaming system 212, or though the odds compiler server 208. The live feed server 210 may provide data for identifying the different live sporting events, and a recipient may subscribe to a particular live feed to receive a live feed associated with the selected live sporting event. In other embodiments, live feeds for multiple live sporting events may be provided through a broadcast feed, with each portion of the live feed identified as being associated with a particular live sporting event so that a recipient may selectively load or read data for a desired live sporting event. The live feed may have a live data feed generated by the live feed server 210, with the live data feed indicating discrete sub-events for a sporting event. The live feed may further have a video stream, or may include video clips showing particular portions of the live sporting event.

In some embodiments, the live feed may include data in the live data feed related to the video of the live video feed. Thus, the live feed may indicate that a particular sub-event is upcoming, and then provide video of the live feed, and present data describing the result of the sub-event. For example, during a baseball game, the live feed may provide a data element describing or identifying an upcoming pitch as an upcoming sub-event, provide video of the pitch, and then provide a data element describing the result of the pitch. In some embodiments, the data elements may be provided in the live data stream, while the video of the pitch may be provided in the live video feed. Additionally, statistics related to the upcoming sub-event may be provided, so that recipients may use that data to develop, for example, the odds of different potential possible outcomes for proposition bets. For example, the live feed server 210 may indicate that the next sub-event will be a pitch, and may provide data such as the hitter and pitcher's identities, names, uniform numbers, or the like, as well as environmental factors such as wind, temperature, game statistics such as number of pitches thrown in the game by the pitcher, available relievers, inning number, baserunner status and identities of base runners, count of balls and strikes, umpire name, identity or statistics, or any other desired or useful statistics.

The odds compiler server 208 may receive a portion of the live feed from the live feed servers 210. In some embodiments, the live feed server 210 may be a server provided by a media entity, sports league broadcast, cable company or the like, or may be provided by a company that handles parsing the live feed for gaming systems or other analytics. The odds compiler servers 208 may be provided by an odds compilation service such as a bookmaker, gambling management company, or other oddsmaker or linemaker service. For example, a bookmaker that takes bets may also provide, either for free or for a fee, data related to the odds of particular proposition bets for live sporting events or sub-events. In some embodiments, the odds compiler servers 208 may also provide the live feed to the gaming management system 214 or to one or more gaming machines 202. In some embodiments, the live feed may include the live data feed, and may be passed on from the live feed servers 210 where the live feed servers provide the live data feed. In other embodiments, the live feed servers 210 may omit the live data feed, and the odds compiler server may generate and provide the live data feed as described above. In yet another embodiment, the odds compiler server 208 may supplement a live data feed from the live feed servers 210 by receiving a live data feed that describes that an upcoming sub-event will occur, and by adding the relevant data to the live feed. For example, the odds compiler server may supplement a live data feed for a baseball game where the live feed indicates that a pitch is upcoming, and then further describes current game conditions such as the game score, inning number, and current strike and ball count. The odds compiler server 208 may add data such as batter or pitcher statistics, or the like, to the live feed. In some embodiments, the odds compiler server 208 may be integrated with the live feed server 210, so a single server or set of servers can provide identification of the live sporting events, identification of the sub-events and proposition bets, odds, and a confirmation or reporting of the results of the sub-events.

In some embodiments, the gaming system 212 has the gaming management system 214 and one or more gaming machines 202. One or more of the live data feeds, live video and odds feeds are sent to the gaming management system 214. The gaming management system 214 may include one or more gaming machine management servers 206, and one or more accounting/auditing systems 216. The accounting/auditing system 216 may be provided to track credits and debits over a quantity of gaming machines 202, and to verify that the gaming machines are operating correctly and without interference or cheating. Additionally, while not shown, the gaming management system 214 may include other systems or subsystems such as web server systems, security systems, backup systems, or the like.

The gaming management system 214 may, in some embodiments, handle the management of bets, resolution of the bets, accounting, payout calculations, player account credit and debits, and the like. In such an embodiment, the gaming machine 202 may be a relatively simple terminal that receives bets from a player, reports the bets to the gaming machine management server 206, and then receives data directing the gaming machine 202 to display a win or loss display to the player. Thus, the gaming machine management server 206 handles selecting the proposition bets based on the selected bet level indicated by a player, determining which, if any, proposition bets for a particular sub-event should pay out, the associated payout, and the appropriate gaming display that should be shown to the player. Such an arrangement may be useful where a large number of the gaming machines 202 are managed by the gaming management system 214, allowing the individual gaming machines 202 to be produced cost effectively since relatively simple machines, or even kiosks, may be used. This is because the gaming machines 202 only need to accept and report bets, and to display the results of bets according to the instructions from the gaming management server 206. In other embodiments, such an arrangement may be useful or advantageous where the gaming management company does not have full control over the hardware on which a gaming machine resides. For example, where a gaming machine is a mobile application on a handheld device such as a smartphone, the gaming management system 214 may handle all of the sensitive transactions, such as locking in bets, handling credits and debits to player accounts, and determining an outcome or resolution and payout for a particular sub-event. Such an arrangement avoids a situation where a bad actor modifies or accesses the mobile application or underlying hardware to cheat the gaming management system 214 by, for example, editing bets or outcomes to unfairly win bets.

In other embodiments, the gaming machine 202 may have secure hardware that handles sensitive portions of the gaming transaction or process, including a determination of selected sub-events and proposition bets on which a player will bet, resolution, outcome and payout of a sub-event or bet, and debiting or crediting of a players account. In such an embodiment, the gaming management system 214 may pass on the live feed to the gaming machine 202, and the gaming machine 202 may use the live feed to handle the betting process, and may report betting activity and results back to the gaming machine management server 206 for analysis, storage, and the like by the accounting/auditing system 216. Such an arrangement may be useful where a limited number of gaming machines 202 are deployed at a particular secure or controllable location, and having the complex gaming system 212 is not economical.

Figure 3:
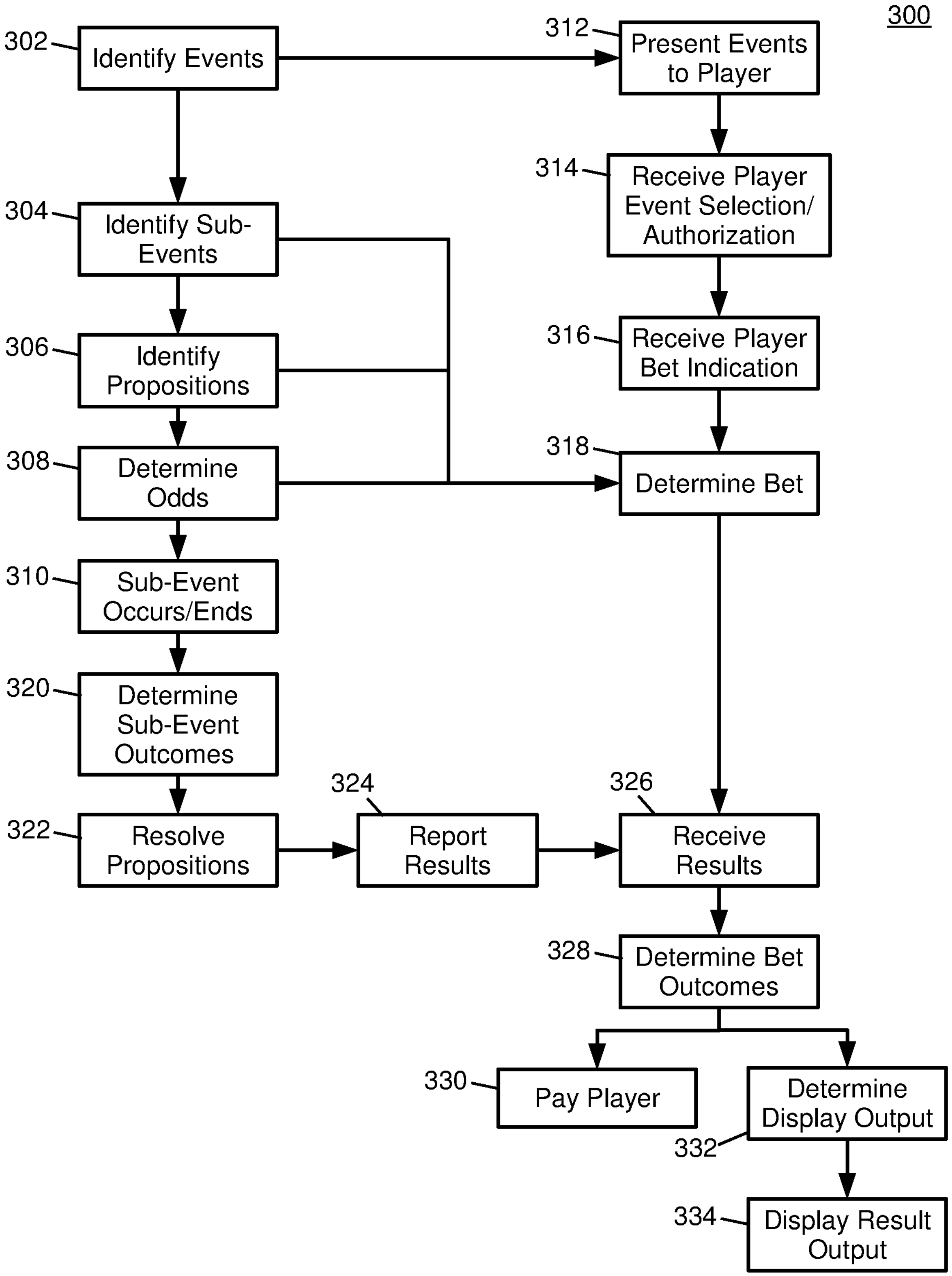
FIG. 3 is a flow diagram illustrating a method for handling of live sports betting according to some embodiments.

FIG. 3 is a flow diagram illustrating the method 300 for handling of live sports betting according to some embodiments. In block 302, one or more live sporting events are identified. In some embodiments, the gaming system receives a feed that provides event data that identifies one or more live sporting events available for betting. In block 312, the available live sporting events may be presented to a player, and in block 314, the player may select one or more of the available live sporting events to bet on. In some embodiments, the live sporting events are identified in a live feed or in a data structure sent in a message separate from the live feed, and may be identified by the live feed server or by the odds compiler server. The gaming system receives event data with a list of, or data describing, the available live sporting events, and in some embodiments, may filter the available events before presentation to the player for selection. For example, the gaming machine management server 206 may remove events that are not bettable in a particular jurisdiction, that are unpopular, that are not suited for the system, where the odds or available propositions are not useful for the gaming system, or based on one or more other filtering criteria. The gaming machine displays the filtered available events to a player, and the player selects one or more events to place bets on. The selection by the player may act as an authorization to place bets on the elected events and is recorded or saved by the gaming machine, and may, in some embodiments, be sent to the gaming management server. The player may then bet on the selected events, where the selected events are selected by the player from the list of filtered events. In block 316, the gaming system may receive a player bet indication. The bet indication may be an indication that the player would like to place one or more bets, and may include the player indicating that they would like to bet multiple lines or make multiple related or unrelated bets at the next opportunity or sub-event. For example, a player may indicate that they want to bet one dollar on five different betting lines, similar to playing multiple lines on a slot machine, by pushing an appropriate button. In other embodiments, a player may automatically be entered to play the maximum number of lines, and may indicate their desire to place a bet by simply selecting or activating a "Play" button, or the like.

In block 304, one or more sub-events are identified. In some embodiments, the sub-events are determined by the live feed server or by the odds compiler server, and sub-event data associated with, or identifying the sub-events, is provided in the live feed. The gaming system receives the live feed or sub-event data, and may, in some embodiments, filter the sub-events or sub-event data based on the selected events. The gaming system may select a sub-event from the filtered or available sub-events based on, for example, the projected schedule or timing of the available sub-events. For example, once the player indicates that they wish to place a bet, the gaming system may use sub-event scheduling data to determine the next sub-event to take place in the available sub-events. Using the next available sub-event may allow the player to play what appears to be a non-sporting or casino style game without waiting for a particular or pre-selected sub-event to occur, as the next available sub-event is automatically selected based on the timing of the player's bet indication. This permits seamless and continuous play by the player without interruption.

In block 306, one or more propositions or proposition bets are identified for each of the sub-events. In block 308, the odds for each of the propositions is determined. The live feed may include available propositions for each sub-event and the associated odds for each proposition. The gaming system identifies propositions for each of the sub-events by selecting from the available propositions. In some embodiments, available propositions for each sub-event may be generated by the odds compiler server or the live feed server, and may be based on the identified sub-events. The propositions for a particular sub-event may be based on the type of sub-event, the data related to the sub-event, or by another selection criteria. For example, for a baseball game event, the sub-event may be a next pitch and the propositions may be for a strike, a hit, a double, a home run, or a ball. However, where the batter has two strikes, a strikeout proposition may also be available. In some embodiments, the gaming system may filter the propositions for each sub-event based on parameters or filters set by the gaming system. In some embodiments, the gaming system may filter out potential propositions based on rules such as minimum or maximum odds for a sub-event or type of proposition, the type of proposition, or the like. For example, a gaming system might filter out a proposition for a walk where the likelihood of a walk is greater than a threshold percentage. Thus, where a pitcher is intentionally walking a batter, and has already thrown three pitches that are obvious and intentional balls, the odds for a fourth ball will be very high, so the system may filter out the ball proposition or even filter out the sub-event entirely since the odds of a ball and walk are almost certain. In other embodiments, the propositions may be selected from the available propositions according to a player action, such as the number of lines bet by the player. Thus, where a player only bets one line, a limited number of propositions may be identified as selected propositions, and where a player bets multiple lines, a larger number of propositions may be identified as selected propositions. In some embodiments, one or more propositions may be identified as "house" propositions. For example, for a baseball pitch sub-event, the odds of a strike on any given pitch may generally be greater than 50%, so a strike may be identified as a house proposition, while one or more other available propositions may be selected as player propositions and may be bettable by the player.

In block 318, a player's bet may be determined. In some embodiments, a player may be automatically set to bet on a default proposition or set of propositions, depending on how many lines the player is playing. In some embodiments, the propositions for betting may be selected according to the best odds from the player propositions, or the player may be determined to have bet on all available propositions. In other embodiments, the player may be presented with the player propositions, and may select one or more player propositions on which to bet, or may be presented with a type or class of propositions, and may be automatically set to bet on propositions from the selected type or class of proposition.

In some embodiments, the bet is determined in block 318 before the sub-event begins, and in some embodiments, a video display may provide a non-sporting display indicating that the sub-event is occurring. For example, a gaming machine that provides a slot machine interface may provide a video display of spinning reels while the sub-event occurs, and may keep the reels spinning until an outcome of the sub-event occurs. Similarly, for a gaming machine that provides a video poker interface, the gaming machine may provide a video display showing a dealer shuffling or dealing while the sub-event occurs to illustrate that a bet is resolving, and prevent the player from attempting to start another bet or cancel the current bet.

In block 310, the sub-event occurs or ends. In block 320, the outcome of the sub-event is determined. The live feed server or odds compiler server may provide an indication in the live feed that the sub-event has terminated, ended or resolved. In some embodiments, the live feed may have a data structure, signal, message, or other information indicating outcomes for the propositions associated with the selected sub-event, with the existence of the proposition outcome information being associated with the end of the sub-event. In other embodiments, the end of the sub-event may be indicated by a message regarding the end of the sub-event sent by the live feed server or the odds compiler server, by a timer expiring, by a time deadline passing, or by another indication mechanism. The sub-event outcomes may include a system that determines when a sub-event has successfully ended. For example, a live feed server may provide data related to outcomes for the proposition, indicating that the sub-event has ended normally or was cancelled, delayed or otherwise abnormally terminated. For example, in a next pitch sub-event, the live feed server may provide data indicating that a valid pitch was performed ending the next pitch sub-event. However, the live feed server may also indicate that a pitch was abnormally terminated, for example, by a timeout, pitcher change, where a pitcher balked during a pitch, or where the pitcher attempted to throw out a base stealing runner.

In block 322, the propositions are resolved, and in block 324, the results are reported to the gaming system. In some embodiments, the live feed server or odds compiler server determines whether each proposition was met, or won. For example, a live feed server may determine, for a next pitch sub-event, that the pitch was a strike, so a strike proposition is met or won. However, propositions for the pitch being a ball, a hit, a double, or a home run would not be met, or would be losses. The live feed server or odds compiler server may then report results by providing data in the live data feed indicating the outcomes of the propositions, and indicating that the sub-event has terminated.

In block 326, the gaming system receives results of the sub-event. In some embodiments, the gaming system or gaming machine may receive a broadcast or unicast transmission from the live feed server or odds compiler server, and in other embodiments, the gaming system or gaming machine may retrieve or request the results, causing the live feed server or odds compiler server to transmit the results as a response.

In block 328, the gaming system determines bet outcomes by determining whether the player won each proposition that the player bet on. The gaming system tracks, or has previously saved, the propositions the player bet on, along with a bet amount for each proposition. The gaming system determines whether each proposition was won, and the payout for each proposition. In some embodiments, the payout amount for each position may be based on the odds associated with the proposition and the amount bet on the proposition. In some embodiments, since each proposition has what are effectively unique odds, even for the same type of proposition for different sub-events, the payout may be calculated based on a fixed payout schedule, on a set of payout rates associated with odds ranges, a range of payouts, a payout proportional to the odds of the proposition, or another payout schedule.

In block 330, the gaming system pays the player. In some embodiments, the gaming system may credit the players account with any winnings, provide gaming tokens or hard currency payout, or make another form of payment or credit to the players account.

In block 332, the gaming system determines the display output associated with the determined bet outcomes, and in block 334, the gaming machine shows the determined display output. Thus, the gaming machine interface may provide a non-sporting video display indicating the outcome of the sports event propositions. For example, in embodiments where the gaming machine provides a slot machine interface, the gaming machine may show reels with symbols aligned to indicate wins on one or more pay lines. In other embodiments where the gaming machine provides a video poker interface, the gaming machine may show a poker hand indicating wins or losses for each proposition.

Figure 4:
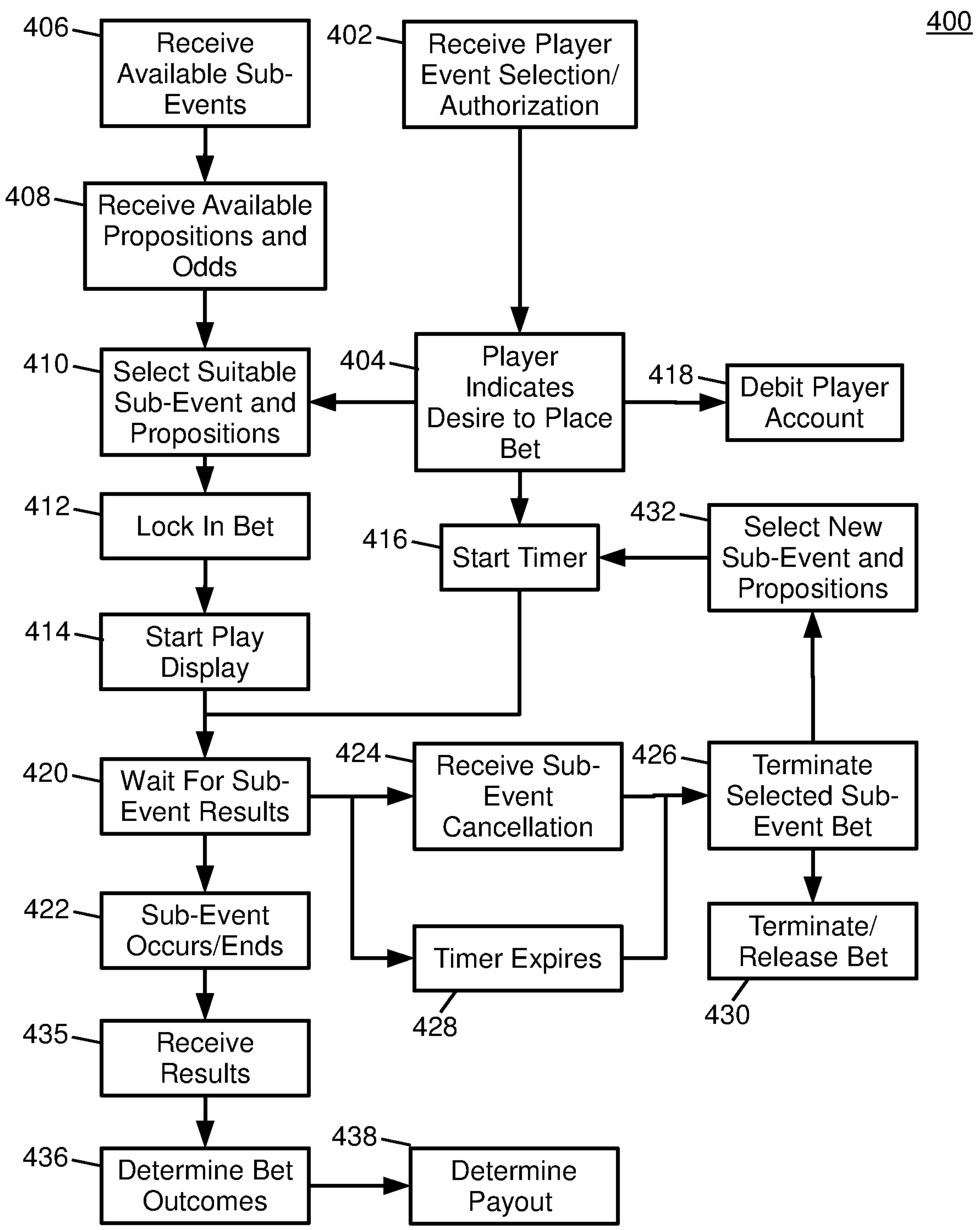
FIG. 4 is a flow diagram illustrating a method for handling of live sports betting and results display according to some embodiments.

FIG. 4 is a flow diagram illustrating the method 400 for handling of live sports betting and results display according to some embodiments. In block 402, the gaming machine receives a player event selection and authorization to bet. In some embodiments, the player is presented with a plurality of bettable events, and selects one or more events to place bets on. The selection of events may act as an authorization to have the gaming machine take bets from the player.

In block 404, the player indicates a desire to place a bet. In some embodiments, the player selects a bet amount, or indicates a number of bets, propositions, or lines to play for the next sub-event. The selection or indication by a player may include pressing a button, pulling a lever, tapping a screen or the like. Once the player indicates their bet, the players account is debited by the bet amount in block 418. In some embodiments, the player's selection of an event may be combined with a player's bet indication. In some embodiments, the player may insert cash, and the entirety of the inserted cash may be applied to the bet, or may be used to fund a temporary credit or account with the gaming machine. In other embodiments, a player account may be maintained with the gaming machine or on a gaming management server. Placing the bet debits the amount of the players account or provides them with credit.

In block 406, the gaming machine receives sub-event data associated with one or more available sub-events of the one or more selected by the player for betting. The available sub-events in the sub-event data may be a list of sub-events generated by a live feed server or an odds compiler server. In some embodiments, the available sub-events may each have associated timing or scheduling information indicating when each sub-event is expected or projected to start or terminate, so that the gaming machine may select a sub-event that provides the earliest resolution for a player to speed play and avoid lag in the player experience.

In block 408, the gaming machine receives available propositions and odds. In some embodiments, the gaming machine receives data in the live feed that lists the available propositions and odds. In block 410, the gaming machine selects a suitable sub-event and associated propositions. Selection of the sub-event and proposition may be made according to the player selected events and in response to the player indicating a desire to place a bet. In some embodiments, the sub-event for the player bet is selected automatically by the gaming machine, and may be selected from the available sub-events by selecting the sub-event that will end soonest, or within a predetermined time. In other embodiments, a player may be presented an option to bet on the next pitch, next football play, next basketball possession, or the like. This may be done by presenting a list of upcoming sub-events from which the player may select, or by the player pressing a button that indicates a bet on the next pitch.

In block 412, the bet is locked in by the gaming machine. In some embodiments, once the player places a bet, or indicates his desire to place a bet, and the suitable sub-event and associated propositions are selected, the bet is "booked" or taken, resulting in the bet being made formal and recorded.

In some embodiments, the gaming machine may start a play display in block 414. Thus, once the bet is locked in, the gaming machine may provide a display to the player that indicates that the best outcome is pending, or that the bet is running or executory. In some embodiments, the gaming machine provides a non-sporting video display such as a slot machine interface, and may display spinning reels that simulate the spinning of traditional slot machine reels.

In order to ensure that each bet is resolved within a reasonable time, a timer may be started in block 416. The timer may be used to ensure that a sub-event that was projected to end at a predetermined time, but that is interrupted or otherwise not completed as expected, does not occupy the gaming machine or player for an indeterminate time. In some embodiments, if a player bets on a sub-event, and the sub-event does not happen as expected, the timer may be used as a threshold for terminating, cancelling or replacing the bet. For example, if a player bet on the next pitch of a baseball game, the pitcher may be pulled from the game, which would call the bet off, since a new pitcher, with different odds for propositions on the next pitch, would have the next pitch, and would create a new sub-event. In another example, for a next pitch bet, the pitcher may balk during the pitch, or the catcher or coach may stop the pitcher for an on-mound conference, significantly delaying resolution of the next pitch sub-event. In yet another example, for a bet on the next play of a football game, the game may be delayed for a television timeout or commercial, which would cause the sub-event to terminate substantially after the originally projected resolution time for the sub-event.

After the timer is started, the gaming machine waits for sub-event results in block 420. The gaming machine may present the play display during the wait for the sub-event results, and may monitor for an end or result of the sub-event, or for an interruption of the sub-event. An interruption of the sub-event may be the expiration of the timer, a notification that the sub-event has been cancelled, or the like. In block 428, the timer may expire, indicating that the sub-event has not ended within a projected time frame, and the sub-event may be considered to have been interrupted. In block 424, the gaming machine may receive a sub-event cancellation message. In some embodiments, the sub-event cancellation message may be data from the live feed server or the odds compiler server indicating that the sub-event has been terminated. In some embodiments, the sub-event cancellation message may be data in the live feed indicating cancellation of the sub-event, or may be a dedicated message, such as a broadcast message, or another indication.

In block 426, the gaming machine may terminate the bet on the selected sub-event. The termination of the sub-event bet may be in response to termination, interruption or cancellation of the sub-event, as a result of the timer expiring, as a result of receiving a sub-event cancellation notification, or as a result of another cause for termination. In some embodiments, once the sub-event bet is terminated, the bet may be terminated or released in block 430, or may be replaced by selecting a new sub-event and associated propositions in block 432. Terminating or releasing the bet, as in block 430, may, in some embodiments, include reversing the bet and crediting the players account with the amount that was wagered on the bet. In such a situation, the method may be restarted to allow the player to continue wagering on new sub-events. In some embodiments, the terminated or related bet for the cancelled sub-event may be replaced by selection of a new sub-event and propositions in block 432. Selecting the new sub-event may include updating the available sub-events, and automatically selecting a new sub-event on which to apply the player's bet, by permitting the player to select a new sub-event from an updated list of sub-events, or by another process for determining or selecting a new sub-event bet. Once a new sub-event is selected, the timer may be started or restarted in block 416, and the gaming machine may then start the wait for sub-event results in block 420 to continue the bet resolution process for the new sub-event.

The gaming machine or gaming system may wait for the sub-event results in block 420 until the sub-event occurs or otherwise ends in block 422, and may receive results of the sub-event and any associated propositions in block 435. As described above, the gaming machine or gaming system may receive a message indicating the end of the sub-event, or may receive, in the live feed or through a message, results for the sub-event or propositions, with the results indicating the end of the sub-event.

In block 436, the gaming machine or gaming system may determine the bet outcomes. In some embodiments, determining bet outcomes may include determining which propositions a player has won or lost according to the received result data, and may include the bet outcome determination described above.

In block 438, the gaming machine or gaming system may determine a payout for each of the winning proposition bets, and in some embodiments, may use the payout determination as described above.

FIG. 5A is a table illustrating the event data 500 for event selection according to some embodiments. The event data 500 may be generated by a live feed server or odds compiler server, and may be sent to the gaming system or gaming machine. In some embodiments, the data 500 may include one or more events 502 that are each described using data such as a matchup description 506 and status 510. The matchup description 506 may be a text string or other data that may be used to present available matches to a player. The status 510 may describe scheduling or a current status of the associated event. For example, one or more events 502 that have not started at the time the available events 502 are compiled may be listed with a projected start time, while events 502 that have already started when the list of events is compiled may be indicated as running or already started. Additionally, each event 502 may have an event type 508, which may be used to further identify the event 502 for a player, and may also be used by the gaming system or gaming machine to determine house or player propositions, valid sub-events, for filtering the sub-events prior to presentation to the player, or for other processes. Additionally, in some embodiments, an event identifier (ID) 504 may be associated with each event 502 so that each event 502 may be tracked and identified in other live feed data.

FIG. 5B is a table illustrating sub-event data 540 with associated proposition data according to some embodiments. In some embodiments, sub-events may be listed with associated propositions 542, with a plurality of propositions 542 being listed for each sub-event, with the sub-event identified by a sub-event identifier ID 544, and each proposition 542 being identified by a unique proposition ID 546. Thus, multiple propositions 542 may be listed for the same sub-event ID 544. In some embodiments, the proposition ID 546 is associated with the sub-event ID 544, and each proposition 542 may also be associated with an event by inclusion of an event ID 504 in each proposition data entry. Additionally, in some embodiments, each proposition 542 may include data such as a sub-event type indicator 548, proposition type indicator 550, or other descriptive data. The sub-event type indicator 548 may indicate the type of sub-event, and may be associated with the event ID 504 or type of event. For example, for a baseball game event, the sub-event type may be a next pitch, an inning or inning half, an at—bat, or another baseball related sub-event. Similarly, the proposition type indicator 550 may indicate the type of proposition 542, and may be associated with the sub-event type 548. For example, for a next pitch sub-event type, the proposition or proposition type 550 may be that the next pitch is a strike, a ball, a hit, a foul or the like, with the proposition 542 being a proposition for the sub-event type. In some embodiments, each proposition 542 may also have odds data 554 indicating the likelihood that the proposition 542 will occur, or that a bettor would win the associated proposition bet. While the odds data 554 is shown as a win percentage, the odds may be in any form, including a payoff ratio, odds of winning, or another odds format.

In some embodiments, each proposition data entry may include time data 552 indicating at least a projected end or resolution time for the associated proposition 542. For example, the time data 552 may directly indicate the time at which the associated proposition is projected to end. In other embodiments, the time may be a start time for the proposition, and the end time for the associated proposition may be projected according to a fixed schedule, according to the sub-event type, based on historical or previous sub-events, or based on another projection method. In other embodiments, the time may be time duration after which the associated proposition is projected to end. In yet other embodiments, the timer used to determine whether the sub-event is terminated, interrupted or cancelled may be set according to the time data associated with the proposition or with the sub-event.

Figures 6, 7:
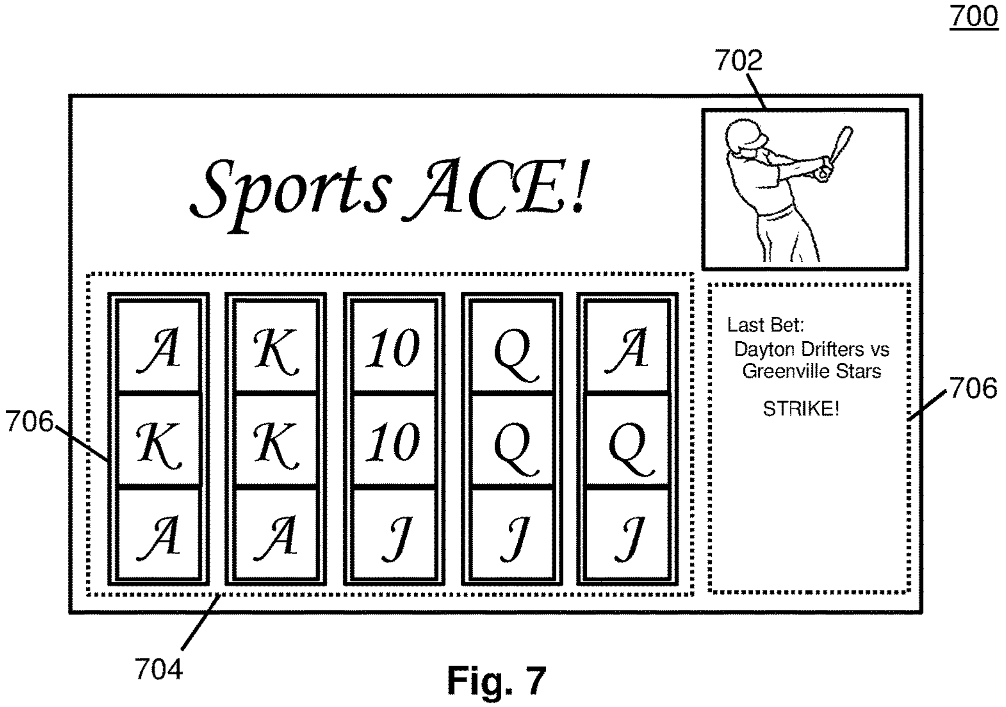
FIG. 6 is a table illustrating the result reporting data for a sub-event or a proposition wager resolution according to some embodiments.
FIG. 7 is a diagram illustrating a display for a slots-style interface used to display sports betting results according to some embodiments.

FIG. 6 is a table illustrating the result reporting data 600 for sub-event or proposition wager resolution according to some embodiments. The result reporting data 600 may include one or more proposition result 602 entries that each have data such as an event ID 504, sub-event ID 544, proposition ID 546 identifying a relevant event, sub-event and proposition so that the proposition result entry may be tied to, or associated with, the relevant proposition for which the proposition result 602 reports results. Each proposition result 602 also includes proposition outcome data 604 indicating whether the proposition was achieved or met, or if a player would win that proposition. For example, for a next pitch sub-event of a baseball game, a pitch resulting in a hit for two bases (a double), the propositions of the pitch being a strike or ball would be a loss, the propositions of the pitch being a hit and a double would be wins, and the proposition that the pitch would result in a home run would be a loss. The win or loss is reported in the proposition outcome data 604. In some embodiments, actual outcome data 606 may be reported, and in some embodiments, may replace the proposition outcome data 604, and the gaming system or gaming machine would determine the outcome of each proposition from the actual outcome data 606. End time data 608 and resulting odds data 610 may also be included for recordkeeping or accounting, and to ensure that the most accurate and up-to-date odds are available to the gaming system.

FIG. 7 is a diagram illustrating a display 700 for a slots-style interface used to display sports betting results according to some embodiments. In some embodiments, a results display area 704 may be a display that has a video display or animation that is unrelated to the sporting event, such as a slot machine-style interface, that is used for displaying the results of sports betting propositions, and may have, for example, a plurality of reels simulating a traditional slot machine. In other embodiments, the results display area may show a video poser interface, a bingo game result, a puzzle interface, or another game or graphic display. In some embodiments, the display 700 may also include a live feed display area 702 where video from the live video feed may be displayed to a user to illustrate the sub-event a user bet on. Additionally, a text area 706 may display text of the most recent sub-event bet outcome, or a history of sub-event bet outcomes.

Figure 8A:
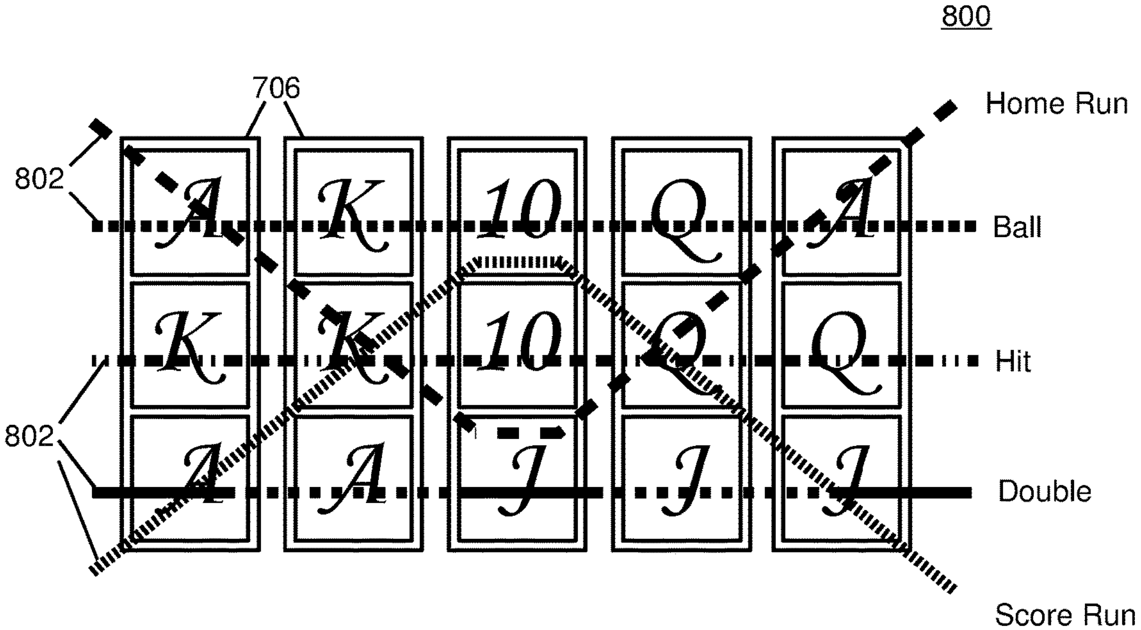
FIGS. 8A and 8B are diagrams illustrating a display of winning and losing proposition bets from a sports event using a slots-style interface according to some embodiments.
Figure 8B:
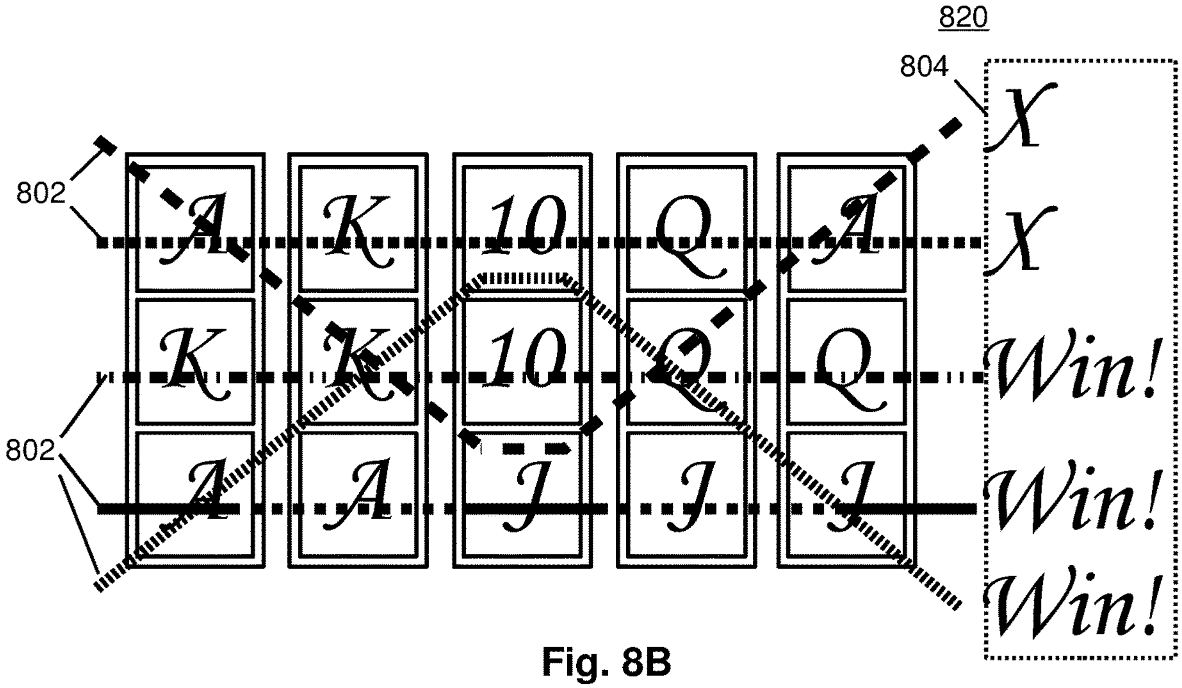

FIGS. 8A and 8B are diagrams illustrating a display of winning and losing proposition bets from a sports event using a slots-style interface according to some embodiments. FIG. 8A is a diagram illustrating a display arrangement 800 for associating propositions with different pay lines 802 for a slot machine-style interface according to some embodiments. When a sub-event ends and the propositions are resolved, the reels of the slot machine output interface may be set to align to show different winning pay lines for different associated propositions. For example, different pay lines 802 may be used to report the results of different propositions for a pitch resulting in a hit, a ball, a double, a home run, and a run scoring. Thus, the results of multiple propositions may be separately displayed on different portions of the non-sporting video display. Since multiple propositions may win, multiple pay lines 802 may be shown as winning or paying out.

FIG. 8B is a diagram illustrating a proposition result reporting display arrangement 820 for a slot machine-style interface according to some embodiments. In some embodiments, a gaming machine may provide a result display region 804 where the result of each proposition bet is illustrated. In an embodiment where the display is a slots-style interface, a win or loss result may be displayed for each proposition. In the illustrated embodiment, proposition bets for a hit, a double and a run scored are shown as wins, while the results for proposition bets for a ball and a home run as shown as losses. Notably, the strike proposition does not have an associated pay line. Thus, the strike proposition may, in an embodiment, be reserved as a house proposition that is not available for betting, and which the house or gaming system retains for house odds or to even the odds provided to players.

Figure 9:
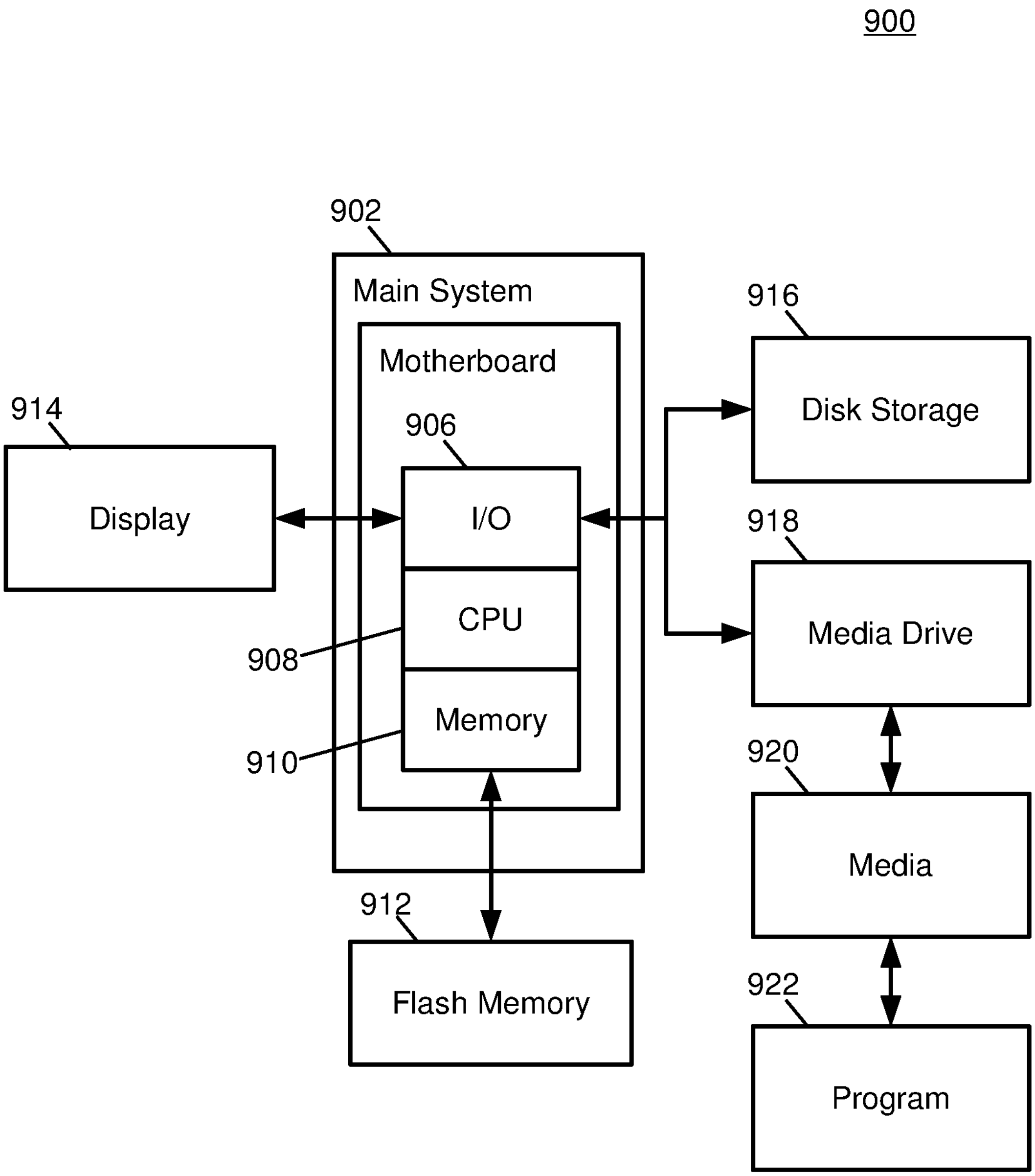
FIG. 9 is a logical diagram illustrating the computing system 900 according to some embodiments.

FIG. 9 is a logical diagram illustrating a computing system 900 according to some embodiments. The computing system 900 may include a number of components that may be used to perform any of the processes described herein. The main system 902 includes a motherboard 904 having an input/output (I/O) section 906, one or more central processing units (CPUs) 908, and a memory section 910, which may have a flash memory card 912 or one or more non-transitory computer readable mediums storing a computer program for execution of the process described herein. The I/O section 906 can be connected to a display 914, a keyboard and/or another user input (not shown), a disk storage unit 916, and a media drive unit 918. The media drive unit 918 can read/write a computer-readable medium 920, which can contain programs 922 and/or databases. However, the computing system 900 may include circuitry or other specialized hardware for carrying out some or all aspects of the processes. In some operational settings, the computing system 900 may be configured as a system that includes one or more units, each of which is configured to carry out some aspects of the processes either in software, hardware, or some combination thereof. The computing system 900 can include a web browser. Moreover, the computing system 900 can be configured to include additional systems in order to fulfill various functionalities. The computing system 900 can communicate with other computing devices based on various computer communication protocols such as Wi-Fi, Bluetooth® (and/or other standards for exchanging data over short distances including those using short-wavelength radio transmissions), universal serial bus (USB), Ethernet, cellular, an ultrasonic or near field local area communication protocol, etc.

An embodiment device includes at least one processor, and a non-transitory computer readable medium connected to the at least one processor and having a computer program stored thereon for execution by the at least one processor. The computer program includes instructions for receiving an event selection from a player, wherein the event selection indicates selection of an event from one or more live sporting events available for betting, receiving a live feed associated with the event, wherein the live feed includes at least a data feed having first data associated with the event, receiving an indication of a bet from the player, identifying, according to first data in the live feed, one or more available sub-events for the event, wherein each available sub-event of the one or more available sub-events is a discrete portion of the event and is shorter than the event, wherein one or more propositions are associated with each available sub-event of the one or more available sub-events, and wherein, for each available sub-event of the one or more available sub-events, each proposition of the one or more propositions of an associated available sub-event is associated with a different potential outcome of the associated available sub-event, selecting a sub-event from the one or more available sub-events, and applying the bet to at least one first proposition associated with the sub-event, determining an outcome of the sub-event, determining a resolution of the first proposition according to the outcome of the sub-event, and displaying a non-sporting video display to the player illustrating the resolution of the first proposition.

In some embodiments, the first data comprises sub-event data having a plurality of entries for each of the one or more available sub-events, wherein each entry of the plurality of entries comprises proposition data for a proposition of the one or more propositions, wherein the proposition data comprises odds of the respective proposition being met during the associated sub-event, and the instructions for determining the resolution of the first proposition according to the outcome of the sub-event includes instructions for determining resolutions of propositions of the plurality of entries. In some embodiments, the computer program further includes instructions for determining a payout for each proposition of the one or more propositions according to the odds of the respective proposition and according to the outcome of the sub-event. In some embodiments, the computer program further includes instructions for beginning display of the non-sporting video display in response to receiving the indication of the bet from the player, and the instructions for determining the outcome of the sub-event includes instructions for determining the outcome of the sub-event while displaying the non-sporting video display. In some embodiments, the non-sporting video display is a display showing a slot machine-style interface. In some embodiments, the computer program further includes instructions for waiting for sub-event results after selecting the sub-event. In some embodiments, the computer program further includes instructions for receiving a transmission comprising the sub-event results while waiting for the sub-event results, and the instructions for determining the outcome of the sub-event includes instructions for determining the outcome according to the received results.

An embodiment method includes receiving, at a gaming machine, from a player, an indication of a desire to bet on one or more live sporting events, determining a sub-event of a selected event of the one or more live sporting events, wherein the sub-event is a discrete portion of the selected event that is shorter than the selected event, determining one or more propositions for the sub-event, wherein each proposition of the one or more propositions is associated with a different potential outcome of the sub-event, applying at least one bet to the one or more propositions in response to the indication of the desire to bet the event, initiating display of a non-sporting display to the player, determining one or more resolutions for the one or more propositions while displaying the non-sporting video display, displaying a result of the non-sporting video display to the player according to the one or more resolutions, and determining a payout for each proposition of the one or more propositions according to odds of the respective proposition being met and according to a resolution of one or more resolutions for the respective proposition.

In some embodiments, the method further includes receiving, at a gaming system comprising the gaming machine, first data in a live feed, wherein the first data comprises sub-event data having a plurality of entries for the sub-event, wherein each entry of the plurality of entries comprises proposition data for a proposition of the one or more propositions, wherein the proposition data comprises the odds of the respective proposition being met. In some embodiments, the one or more propositions for the sub-event comprises a plurality of propositions for the sub-event, wherein the applying the at least one bet to the one or more propositions comprises applying a bet to each proposition of the plurality of propositions, and wherein the displaying the result of the non-sporting display to the player comprises displaying the result of the non-sporting display with results for different propositions of the plurality of propositions separately displayed on different portions of the non-sporting video display. In some embodiments, the method further includes waiting for sub-event results after applying at least one bet to the one or more propositions and after the initiating the display of the non-sporting display to the player, determining at least one of an end of the sub-event or an interruption of the sub-event according to a received sub-event transmission, and receiving, in response to determining an end of the sub-event, results of the sub-event, wherein determining the one or more resolutions for the one or more propositions is performed in response to determining the end of the sub-event and according to the results of the sub-event, wherein displaying the result of the non-sporting display to the player according to the one or more resolutions is performed in response to determining the end of the sub-event and according to the results of the sub-event, and wherein the determining the payout for each proposition of the one or more propositions is performed in response to determining the end of the sub-event and according to the results of the sub-event. In some embodiments, the method further including performing, in response to determining the interruption of the sub-event, at least one of determining a new sub-event of the selected event as the sub-event and determining one or more new propositions for the sub-event as the one or more propositions. or cancelling the bet in response to determining the interruption of the sub-event. In some embodiments, cancellation of the sub-event is indicated by at least one of an expiration of a timer or receipt of a sub-event cancellation message.

An embodiment method includes receiving, by a gaming machine, an event selection from a player, wherein the event selection indicates selection of an event from one or more live sporting events available for betting, receiving a live feed associated with the event, wherein the live feed includes at least a data feed having first data associated with the event, receiving, by the gaming machine, an indication of a bet from the player, identifying, according to first data in the live feed, one or more available sub-events for the event, wherein each available sub-event of the one or more available sub-events is a discrete portion of the event and is shorter than the event, wherein one or more propositions are associated with each available sub-event of the one or more available sub-events, and wherein, for each available sub-event of the one or more available sub-events, each proposition of the one or more propositions of an associated available sub-event is associated with a different potential outcome of the associated available sub-event, selecting a sub-event from the one or more available sub-events, and applying the bet to at least one first proposition associated with the sub-event, determining an outcome of the sub-event, determining a resolution of the first proposition according to the outcome of the sub-event, and displaying, by the gaming machine, a non-sporting video display to the player, the video display illustrating the resolution of the first proposition in a context of the non-sporting video display.

In some embodiments, the first data comprises sub-event data having a plurality of entries for each of the one or more available sub-events, wherein each entry of the plurality of entries comprises proposition data for a proposition of the one or more propositions, wherein the proposition data comprises odds of the respective proposition being met during the associated sub-event, and wherein the determining the resolution of the first proposition according to the outcome of the sub-event comprises determining resolutions of propositions of the plurality of entries. In some embodiments, the method further includes determining a payout for each proposition of the one or more propositions according to the odds of the respective proposition and according to the outcome of the sub-event. In some embodiments, the method further includes beginning display of the non-sporting video display in response to receiving the indication of the bet from the player, wherein determining the outcome of the sub-event comprises determining the outcome of the sub-event while displaying the non-sporting video display. In some embodiments, the non-sporting video display is a display showing a casino-style gaming interface. In some embodiments, the method further includes waiting for sub-event results after selecting the sub-event. In some embodiments, the method further includes receiving a transmission comprising the sub-event results while waiting for the sub-event results, wherein the determining the outcome of the sub-event comprises determining the outcome according to the received results.

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specifications and drawings are to be regarded in an illustrative rather than a restrictive sense. In some embodiments, the machine-readable medium can be a non-transitory form of machine-readable medium.

What is claimed is:

1. A device, comprising:

at least one processor; and a non-transitory computer readable medium connected to the at least one processor and having a computer program stored thereon for execution by the at least one processor, the computer program including instructions for:

receiving an event selection from a player, wherein the event selection indicates selection of an event from one or more live sporting events available for betting;

receiving a live feed associated with the event, wherein the live feed includes at least a data feed having first data associated with the event;

receiving an indication of a bet from the player;

identifying, according to the first data in the live feed, one or more available sub-events for the event, wherein each available sub-event of the one or more available sub-events is a discrete portion of the event and is shorter than the event, wherein one or more propositions are associated with each available sub-event of the one or more available sub-events, and wherein, for each available sub-event of the one or more available sub-events, each proposition of the one or more propositions of an associated available sub-event is associated with a different potential outcome of the associated available sub-event;

selecting a sub-event from the one or more available sub-events, and applying the bet to at least one first proposition associated with the sub-event;

determining an outcome of the sub-event;

determining a resolution of the first proposition according to the outcome of the sub-event; and displaying a non-sporting video display to the player illustrating the resolution of the first proposition, wherein the non-sporting video display is a gaming interface unrelated to the event, and wherein the resolution of the first proposition is indicated by one or more indicated wins or losses of a game different from the event in the gaming interface.

2. The device according to claim 1, wherein the first data comprises sub-event data having a plurality of entries for each of the one or more available sub-events, wherein each entry of the plurality of entries comprises proposition data for a proposition of the one or more propositions, wherein the proposition data comprises odds of the respective proposition being met during the associated sub-event; and wherein the instructions for determining the resolution of the first proposition according to the outcome of the sub-event include instructions for determining resolutions of propositions of the plurality of entries.

3. The device according to claim 2, wherein the computer program further include instructions for determining a payout for each proposition of the one or more propositions according to the odds of the respective proposition and according to the outcome of the sub-event.

4. The device according to claim 1, wherein the computer program further includes instructions for beginning display of the non-sporting video display in response to receiving the indication of the bet from the player; and wherein the instructions for determining the outcome of the sub-event includes instructions for determining the outcome of the sub-event while displaying the non-sporting video display.

5. The device according to claim 4, wherein the non-sporting video display is a display showing a slot machine-style interface.

6. The device according to claim 1, wherein the computer program further includes instructions for waiting for sub-event results after selecting the sub-event.

7. The device according to claim 6, wherein the computer program further includes instructions for receiving a transmission comprising the sub-event results while waiting for the sub-event results; and wherein the instructions for determining the outcome of the sub-event include instructions for determining the outcome according to the received results.

8. A method, comprising:

receiving, at a gaming machine, from a player, an indication of a desire to bet on one or more live sporting events;

determining a sub-event of a selected event of the one or more live sporting events, wherein the sub-event is a discrete portion of the selected event that is shorter than the selected event;

determining one or more propositions for the sub-event, wherein each proposition of the one or more propositions is associated with a different potential outcome of the sub-event;

applying at least one bet to the one or more propositions in response to the indication of the desire to bet the event;

initiating display of a non-sporting video display to the player;

determining one or more resolutions for the one or more propositions while displaying the non-sporting video display;

displaying a result of the non-sporting video display to the player according to the one or more resolutions, wherein the non-sporting video display is a gaming interface unrelated to the event, and wherein the one or more resolutions for the one or more propositions are indicated by one or more indicated wins or losses of a game different from the selected event in the gaming interface; and determining a payout for each proposition of the one or more propositions according to odds of the respective proposition being met and according to a resolution of one or more resolutions for the respective proposition.

9. The method according to claim 8, further comprising receiving, at a gaming system comprising the gaming machine, first data in a live feed, wherein the first data comprises sub-event data having a plurality of entries for the sub-event, wherein each entry of the plurality of entries comprises proposition data for a proposition of the one or more propositions, wherein the proposition data comprises the odds of the respective proposition being met.

10. The method according to claim 8, wherein the one or more propositions for the sub-event comprises a plurality of propositions for the sub-event;

wherein the applying the at least one bet to the one or more propositions comprises applying a bet to each proposition of the plurality of propositions; and wherein the displaying the result of the non-sporting video display to the player comprises displaying the result of the non-sporting video display with results for different propositions of the plurality of propositions separately displayed on different portions of the non-sporting video display.

11. The method according to claim 8, further comprising:

waiting for sub-event results after applying at least one bet to the one or more propositions and after the initiating the display of the non-sporting video display to the player;

determining at least one of an end of the sub-event or an interruption of the sub-event according to a received sub-event transmission; and receiving, in response to determining an end of the sub-event, results of the sub-event;

wherein determining the one or more resolutions for the one or more propositions is performed in response to determining the end of the sub-event and according to the results of the sub-event;

wherein displaying the result of the non-sporting video display to the player according to the one or more resolutions is performed in response to determining the end of the sub-event and according to the results of the sub-event; and wherein the determining the payout for each proposition of the one or more propositions is performed in response to determining the end of the sub-event and according to the results of the sub-event.

12. The method according to claim 11, further comprising performing, in response to determining the interruption of the sub-event, at least one of:

determining a new sub-event of the selected event as the sub-event and determining one or more new propositions for the sub-event as the one or more propositions; or cancelling the bet in response to determining the interruption of the sub-event.

13. The method according to claim 12, wherein cancellation of the sub-event is indicated by at least one of an expiration of a timer or receipt of a sub-event cancellation message.

14. A method, comprising:

receiving, by a gaming machine, an event selection from a player, wherein the event selection indicates selection of an event from one or more live sporting events available for betting;

receiving a live feed associated with the event, wherein the live feed includes at least a data feed having first data associated with the event;

receiving, by the gaming machine, an indication of a bet from the player;

identifying, according to the first data in the live feed, one or more available sub-events for the event, wherein each available sub-event of the one or more available sub-events is a discrete portion of the event and is shorter than the event, wherein one or more propositions are associated with each available sub-event of the one or more available sub-events, and wherein, for each available sub-event of the one or more available sub-events, each proposition of the one or more propositions of an associated available sub-event is associated with a different potential outcome of the associated available sub-event;

selecting a sub-event from the one or more available sub-events, and applying the bet to at least one first proposition associated with the sub-event;

determining an outcome of the sub-event;

determining a resolution of the first proposition according to the outcome of the sub-event; and displaying, by the gaming machine, a non-sporting video display to the player, the video display illustrating the resolution of the first proposition in a context of the non-sporting video display, wherein the non-sporting video display is a gaming interface unrelated to the event, and wherein the resolution of the first proposition is indicated by one or more indicated wins or losses of a game different from the event in the gaming interface.

15. The method according to claim 14, wherein the first data comprises sub-event data having a plurality of entries for each of the one or more available sub-events, wherein each entry of the plurality of entries comprises proposition data for a proposition of the one or more propositions, wherein the proposition data comprises odds of the respective proposition being met during the associated sub-event; and wherein the determining the resolution of the first proposition according to the outcome of the sub-event comprises determining resolutions of propositions of the plurality of entries.

16. The method according to claim 15, further comprising determining a payout for each proposition of the one or more propositions according to the odds of the respective proposition and according to the outcome of the sub-event.

17. The method according to claim 14, further comprising beginning display of the non-sporting video display in response to receiving the indication of the bet from the player;

wherein determining the outcome of the sub-event comprises determining the outcome of the sub-event while displaying the non-sporting video display.

18. The method according to claim 17, wherein the non-sporting video display is a display showing a casino-style gaming interface.

19. The method according to claim 14, further comprising waiting for sub-event results after selecting the sub-event.

20. The method according to claim 19, further comprising receiving a transmission comprising the sub-event results while waiting for the sub-event results;

wherein the determining the outcome of the sub-event comprises determining the outcome according to the received results.

* * * * *